LOW D.C. POWER HORIZONTAL DEFLECTION CIRCUIT

Filed Sept. 30, 1960 3 Sheets-Sheet 1

INVENTOR.
DONALD R. TAYLOR, JR.
BY Fordyce A. Bothwell
ATTORNEY

INVENTOR.
DONALD R. TAYLOR, JR.
BY
Fordyce A. Bothwell
ATTORNEY

LOW D.C. POWER HORIZONTAL DEFLECTION CIRCUIT

Filed Sept. 30, 1960 3 Sheets-Sheet 3

INVENTOR.
DONALD R. TAYLOR, JR.
BY Fordyce A. Bothwell
ATTORNEY

United States Patent Office 3,198,978

Patented Aug. 3, 1965

3,198,978

LOW D.C. POWER HORIZONTAL DEFLECTION CIRCUIT

Donald R. Taylor, Jr., Philadelphia, Pa., assignor, by mesne assignments, to Philco Corporation, Philadelphia, Pa., a corporation of Delaware Filed Sept. 30, 1960, Ser. No. 59,712
7 Claims. (Cl. 315—27)

This invention relates to power conversion systems and more particularly to the conversion of high-voltage D.C. power to low-voltage D.C. power. The invention is applicable generally wherever it is necessary to provide substantial low-voltage D.C. power which a battery alone cannot supply, as, for example, in a transistorized horizontal deflection system of a television receiver where substantial D.C. power at about 12 volts is required.

While it is possible to provide low-voltage D.C. power by transforming a relatively high A.C. line voltage (e.g. 115 volts) to a low voltage and by rectifying and filtering at low voltage and high current, the transformer and filter required to do so are costly, bulky and heavy which makes this conventional method impractical, particularly in cases where bulk and weight are important factors as in the case of a portable television receiver.

It is possible economically to rectify and filter at the relatively high voltage and low current of an A.C. supply line to provide high-voltage D.C. power. This does not require the costly and bulky filter required for filtering at low voltage and high current. However, it then becomes necessary to convert the high-voltage D.C. power to low-voltage D.C. power.

The principal object of this invention is to provide a satisfactory system for this purpose.

Another object of the invention is to provide a novel combined power conversion and horizontal output circuit for a television receiver, which effects substantial economy.

Other objects and features of the invention will become apparent as the description proceeds.

In accordance with this invention, conversion of high-voltage D.C. power to low-voltage D.C. power is accomplished by successively and alternately charging a capacitor and discharging it into an inductor, and by controlling the timing of the charge and discharge. In the case of a horizontal deflection system for a television receiver, the inductor may be the horizontal winding of the deflection yoke.

The invention may be fully understood from the following detailed description with reference to the accompanying drawings wherein FIG. 1 is a schematic illustration which will serve to demonstrate the principles of this invention;

Figure 1:
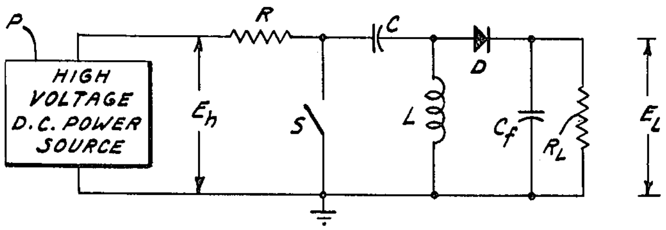

Referring first to FIG. 1, an energy-storage capacitor C is serially included in a circuit for charging the capacitor from a high-voltage D.C. power source P through a diode rectifier D and load resistor $R_L$ across which there is a filter capacitor $C_f$. An inductor L is connected across the circuit intermediate the capacitor C and the diode rectifier D. A switch S which may be a switching transistor or other semiconductor device such as a controlled rectifier, is also connected across the circuit on the opposite side of capacitor C. Resistor R prevents shorting of the power source during the "switch on" period and regulates the rate of charging of capacitor C. The switch is cyclically opened and closed to effect successive and alternate charging of the capacitor and discharging thereof into the inductor L.

Figure 2:
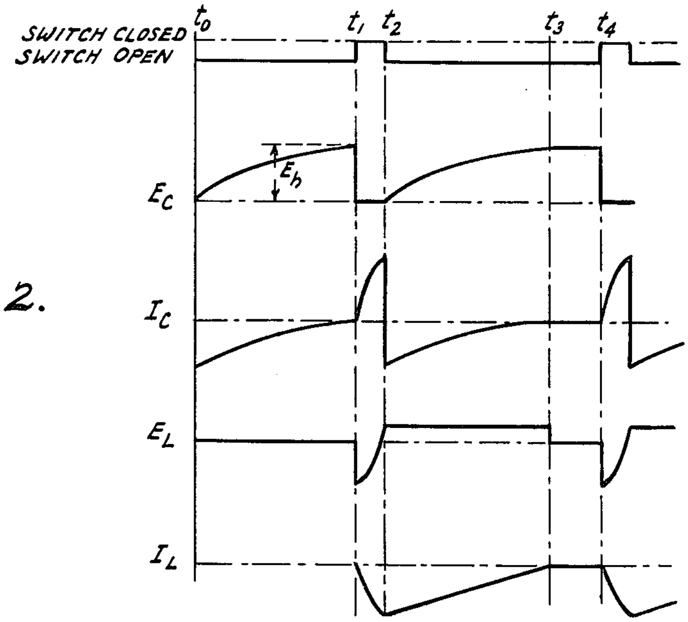
FIG. 2 illustrates the waveforms which are of interest in connection with FIG. 1.

The operation of the circuit is depicted in FIG. 2 to which reference is now made. In the illustration of FIG. 2, $E_C$ is the potential between the input side of capacitor C and ground, $I_C$ is the current through the capacitor, $E_L$ is the voltage across inductor L, and $I_L$ is the current through the inductor.

The switch is initially open at time $t_0$, and the capacitor C charges through diode rectifier D and resistor $R_L$ to a voltage substantially equal to the source voltage $E_h$. At the time $t_1$ the switch is closed, and $E_C$ goes immediately to zero. The capacitor then discharges into the inductor L, starting a free oscillation period of approximately one-quarter cycle (of the period determined by L and C). This produces a sudden negative excursion of the inductor voltage $E_L$ which cuts off the diode rectifier D. During the free oscillation period, the magnitude of the capacitor-inductor current increases sinusoidally while the inductor voltage changes co-sinusoidally. The inductor voltage goes through zero and reverses. When the reversed voltage rises to a value equal to the voltage across the load, the rectifier conducts and the energy stored in the inductor starts being transferred to the load. The switch is turned off at this point. The inductor current has gone to a point slightly beyond its sine peak at time $t_2$ and now discharges linearly into the load. Also, as soon as the switch is opened the capacitor begins to recharge When the inductor current goes to zero at time $t_3$ the capacitor is almost completely recharged and the rectifier stops conducting. A short time later, at time $t_4$, the switch is closed and the capacitor again discharges into the inductor.

The load has been represented as a resistance $R_L$ with a filter capacitor across it. The time constant of this combination is assumed to be very large compared with a single period of the power transformation circuit. This period together with the value of the voltage $E_h$ and the size of capacitor C will determine the maximum amount of power that can be transferred to the load. $R_L$ must then be adjusted to give the desired voltage, $E_L$, across it.

From the above description it will be seen that this invention effects conversion of high-voltage D.C. power to low-voltage D.C. power by successively and alternately storing energy in a capacitor and discharging the stored energy into an inductor, and by effecting transfer of the energy to a load.

Figure 3:
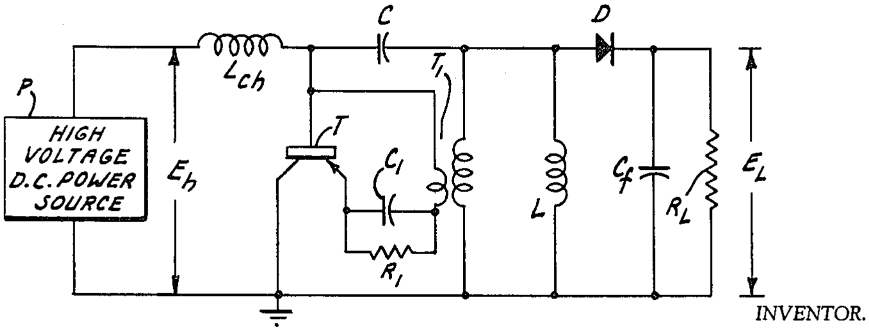
FIG. 3 is a schematic illustration of a practical embodiment of the invention employing a transistor as a switching device.

A practical embodiment of the same circuit is shown in FIG. 3. Resistor R of FIG. 1 has been replaced by an inductor $L_{ch}$ in order to avoid power losses during the "switch on" interval. This inductor should have a minimum inductance making its natural period in combination with capacitor C at least twice the duration of the "switch off" interval. The switch in this instance is the transistor T. A transformer $T_1$, a resistor $R_1$ and a capacitor $C_1$ are connected to the transistor so as to form a free-running blocking oscillator which performs the switching function. The circuit is essentially that of FIG. 1 with an automatic switch, and it operates in the manner described above.

Since the circuit produces a sawtooth current, it may be employed as a sweep circuit or it may be adapted for horizontal deflection in television receivers as in the embodiments now to be described.

Figure 4:
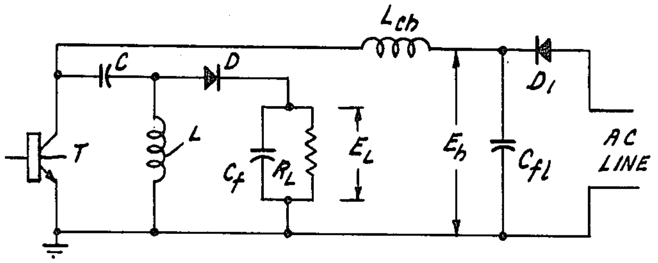
FIG. 4 is a schematic illustration of a combined power converter and horizontal output circuit for a television receiver according to this invention.

FIG. 4 shows a combination power conversion and horizontal output circuit for a television receiver. The elements corresponding to those of FIGS. 1 and 3 are similarly designated. In this instance the transistor T acts as the horizontal output stage as well as the power converter switch. The timing is provided by the signal normally supplied to the horizontal output stage by the horizontal synchronizing and oscillator circuit. Also, in this instance, the inductor L is the horizontal winding of the deflection yoke, the linear discharge (i.e. switch off) period corresponding to the scan period and the free oscillation (i.e. switch on) period corresponding to the retrace period. The load $R_L$ in this instance may be either partly or wholly composed of other low voltage power-utilizing circuits in the television receiver.

High-voltage D.C. power is supplied to this circuit by rectifying and filtering the high-voltage power supplied by an A.C. line, there being provided for this purpose a diode rectifier $D_1$ and a filtering capacitor $C_{f1}$. The operation of the circuit is the same as described above except that in this instance a substantial amount of the energy is utilized for deflection.

Figure 5:
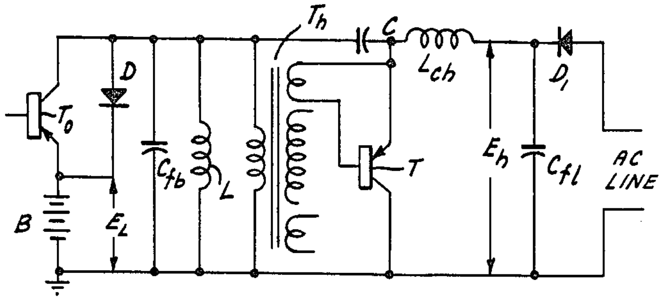
FIG. 5 is a schematic illustration of such a combined circuit employing a battery.

FIG. 5 shows another embodiment of a combined power converter and horizontal output circuit. In this instance, a separate transistor $T_0$ is provided in a conventional horizontal output stage which includes the damper diode D and the flyback capacitor $C_{fb}$, and a battery B is also provided. In this instance, the damper diode D serves the purpose of the diode D in the preceding figures. Also, in this instance, the power converter timing signal in the form of a pulse is supplied to transistor T by the picture tube high voltage supply transformer $T_h$.

Figure 6:
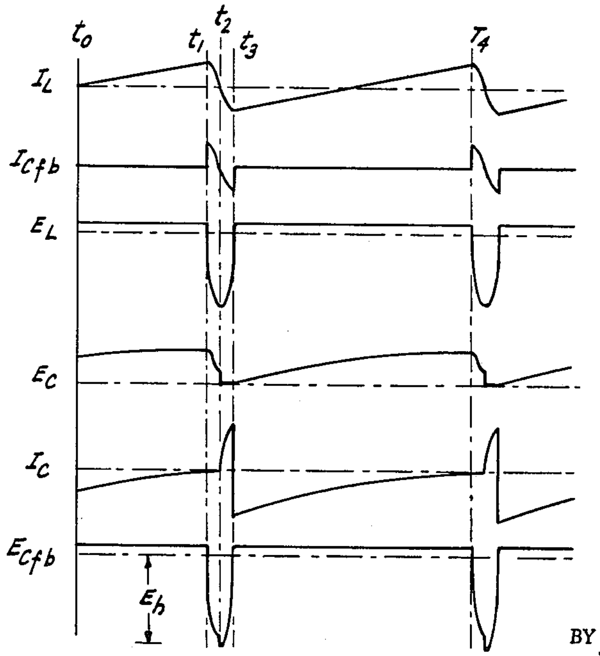
FIG. 6 illustrates the waveforms which are of interest in connection with FIG. 5.

The operation of this circuit is depicted in FIG. 6. The first three waveforms depict the operation of the horizontal output stage. The voltage $E_C$ from the input of the power converter capacitor C to ground may be considered as increasing during the "switch-off" period and as being zero during the "switch on" period. The start of this "switch on" period brings about the free oscillation quarter cycle during which the energy stored in capacitor C is transferred to inductor L, which in this circuit is the yoke inductance. This point in time should coincide with the flyback voltage peak, i.e. the end of the first quarter cycle of free oscillation which was started by the switching off of the horizontal output transistor $T_0$. Therefore, from theoretical considerations, the "switch on" time should start at $t_2$ (or perhaps a little before in consideration of the rectifier bias produced by the battery voltage) and end at time $t_3$. This degree of precision was not found to be necessary, thus making it possible to use the picture tube high voltage power supply pulse to supply the timing. The discharge of the yoke through the rectifier into the load continues until time $t_4$ when the yoke is completely discharged. At this point the horizontal output transistor conducts so that the battery is used to charge up the inductor to renew the cycle of events. The last waveform shows the flyback pulse, indicating that the voltage appearing across the horizontal output transistor never exceeds $E_h$.

Figure 7:
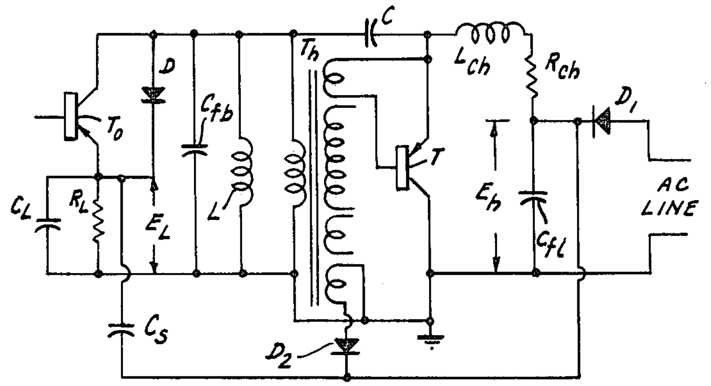
FIG. 7 is a schematic illustration of a modified form of the same system omitting the battery.

FIG. 7 shows a modification of the same circuit in which the battery is replaced by the RC load $R_LC_L$, a starting capacitor $C_s$ is connected as shown, and a stabilizing circuit is provided. The latter comprises an additional winding on the picture tube high voltage power supply transformer and a diode rectifier $D_2$. By this arrangement, if the voltage rises at the load, the higher resulting flyback pulse causes the stabilizing diode rectifier $D_2$ to conduct, transferring the excess power back into the $E_h$ power supply.

Figure 8:
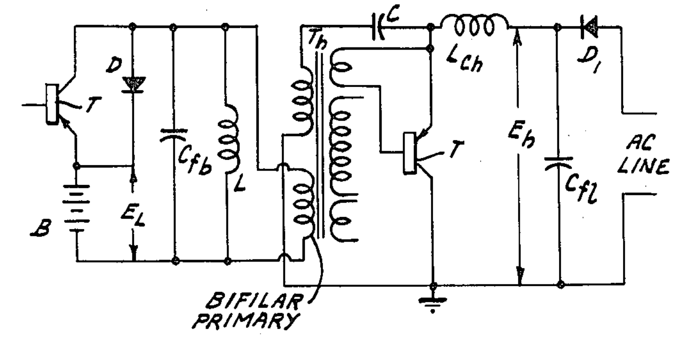
FIG. 8 is a schematic illustration of a system in which the picture tube high voltage power transformer is used additionally as a line isolation transformer.

FIG. 8 shows a circuit which is identical with that of FIG. 5 except that the picture tube high voltage supply transformer is made to serve additionally as an isolating transformer by using a bifilar primary. This circuit retains A.C. line connection to the elements to the right of said transformer but removes it from the elements to the left of said transformer.

Figure 9:
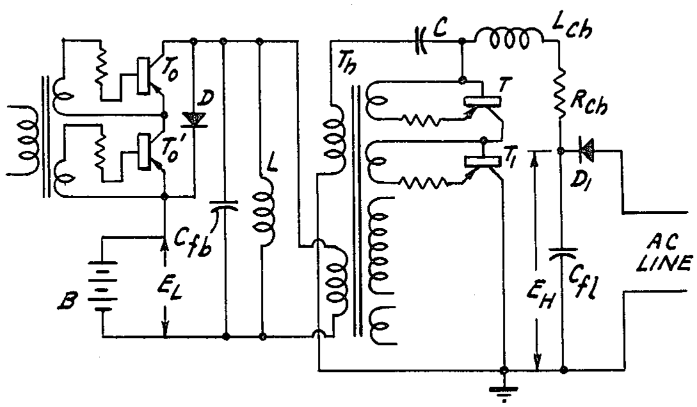
FIG. 9 is a schematic illustration of a similar system employing series operation of output transistors.

FIG. 9 shows a circuit which is similar to that of FIG. 8, but is adapted for use where the voltages used make the ratings of a single transistor inadequate. In this instance two series-connected output transistors $T_0$ and $T'_0$ are employed. Also, in this instance, two power conversion transistors T and T′ are employed.

While certain embodiments of the invention have been illustrated and described, it will be understood that the invention is not limited thereto but contemplates such modifications and further embodiments as may occur to those skilled in the art.

I claim:

1. A combined horizontal deflection and power supply system for a television receiver, comprising a horizontal output stage including a semiconductor device, a deflection inductor connected to said stage, a high voltage supply transformer also connected to said stage for supplying high voltage to the picture tube of the television receiver, an energy-storage capacitor coupled to said inductor to supply energy thereto, a charging circuit for said capacitor, means for supplying high-voltage D.C. power to said circuit to store energy in said capacitor, a switching semiconductor device connected across said circuit to control the energy-storage in said capacitor and the transfer of stored energy to said inductor, and means for supplying control pulses from said transformer to said switching device.

2. A system according to claim 1, including a diode in shunt with the first-mentioned device.

3. A system according to claim 2, including parallel-connected resistance and capacitance elements in series with said shunt-connected device and diode.

4. A system according to claim 2, including a battery in series with said shunt-connected device and diode.

5. A system according to claim 2, wherein said transformer is connected to isolate the high-voltage power supply means from said output stage and said inductor, the coupling of said capacitor to said inductor being through said transformer.

6. A system according to claim 5, wherein said output stage includes a plurality of series-connected semiconductor devices.

7. In a horizontal deflection system for a television receiver, a horizontal output stage, a deflection inductor connected to said stage, a transformer connected to said stage for supplying high voltage to the picture tube of the television receiver, an energy-storage capacitor coupled to said inductor to supply energy thereto, a charging circuit for said capacitor, means for supplying high-voltage D.C. power to said circuit to store energy in said capacitor, a switching device connected to said circuit so as to control the energy storage in said capacitor and the transfer of stored energy to said inductor, and means for supplying control pulses from said transformer to said switching means.

References Cited by the Examiner

UNITED STATES PATENTS

| | | | |
|---|---|---|---|
| 2,920,259 | 1/60 | Light | 315—27 |
| 2,963,619 | 12/60 | Fathauer | 315—29 X |
| 2,964,673 | 12/60 | Stanley | 315—27 X |
| 2,995,679 | 8/61 | Skoyles | 315—29 |
| 2,996,641 | 8/61 | Paynter | 315—29 X |
| 3,030,444 | 4/62 | Preisig. | |

DAVID G. REDINBAUGH, *Primary Examiner.*

RALPH G. NILSON, *Examiner.*